Aug. 7, 1945.　　　　H. P. GUIRL　　　　2,381,742
RESISTANCE WELDING METALLIC STRIPS TO METALLIC BODIES
Filed Dec. 27, 1943　　　5 Sheets-Sheet 1
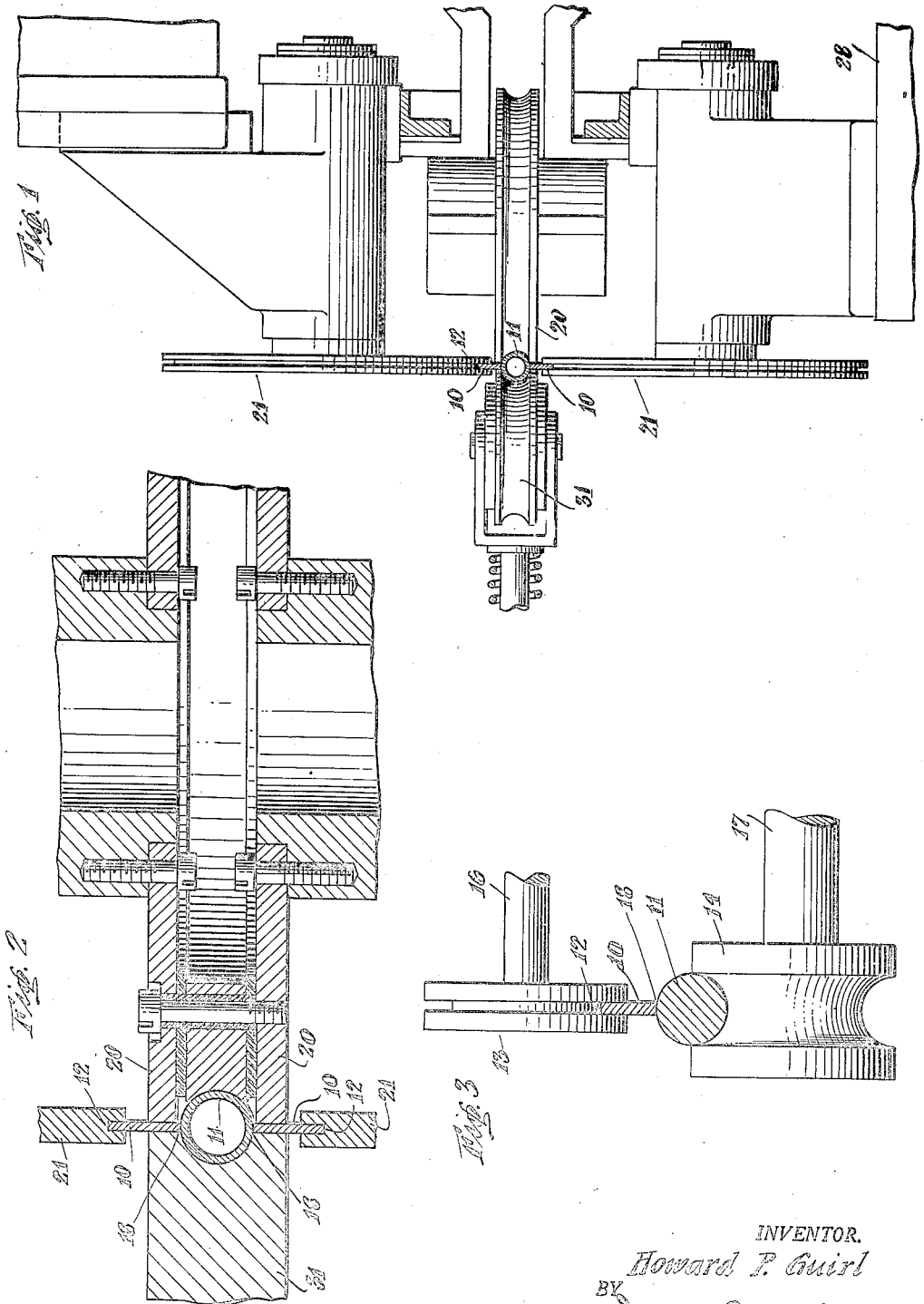
INVENTOR.
Howard P. Guirl
BY
ATTORNEY Aug. 7, 1945.   H. P. GUIRL   2,381,742
RESISTANCE WELDING METALLIC STRIPS TO METALLIC BODIES
Filed Dec. 27, 1943   5 Sheets-Sheet 2

INVENTOR.
Howard P. Guirl
BY
ATTORNEY

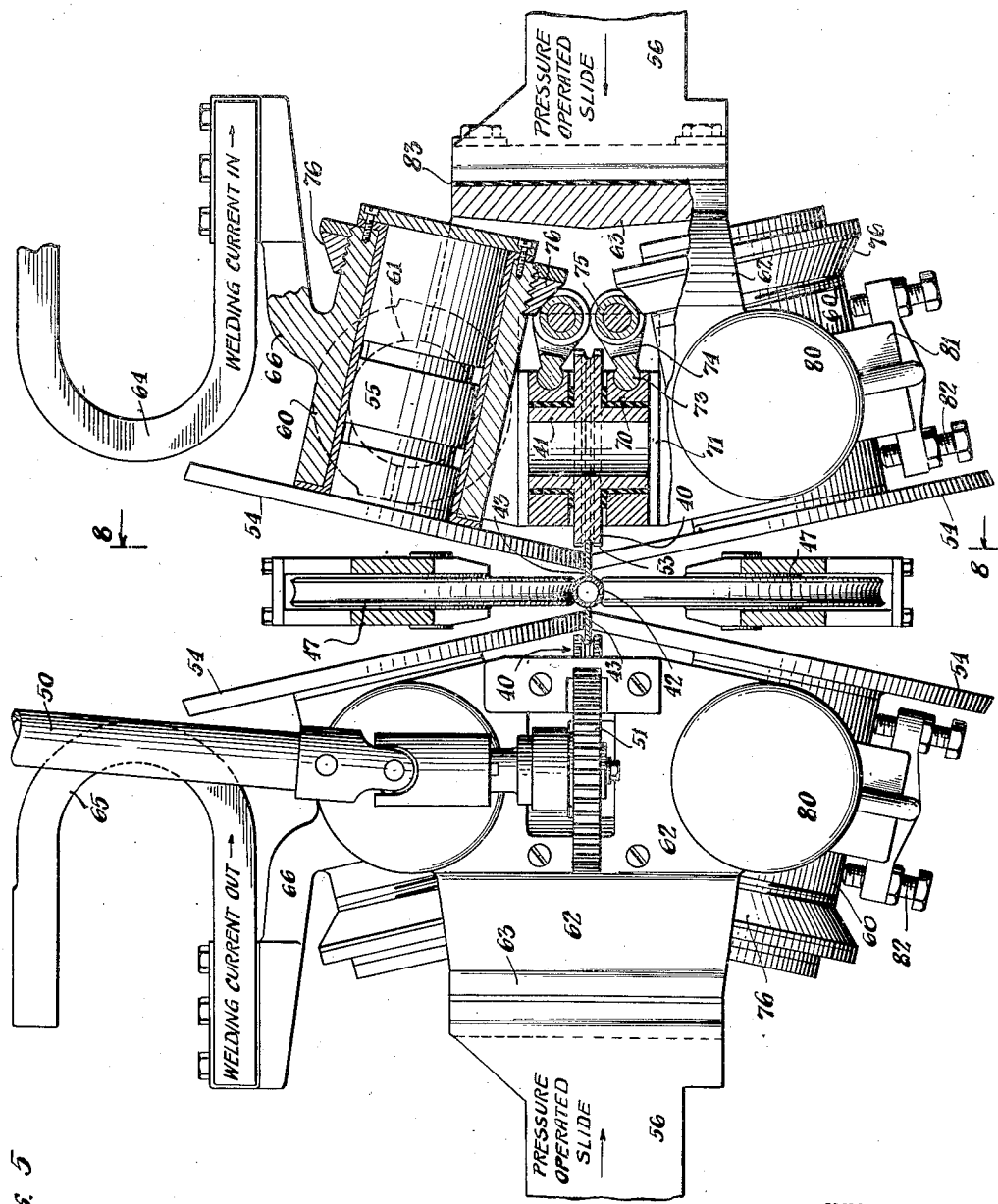

Aug. 7, 1945.     H. P. GUIRL     2,381,742
RESISTANCE WELDING METALLIC STRIPS TO METALLIC BODIES
Filed Dec. 27, 1943     5 Sheets-Sheet 4
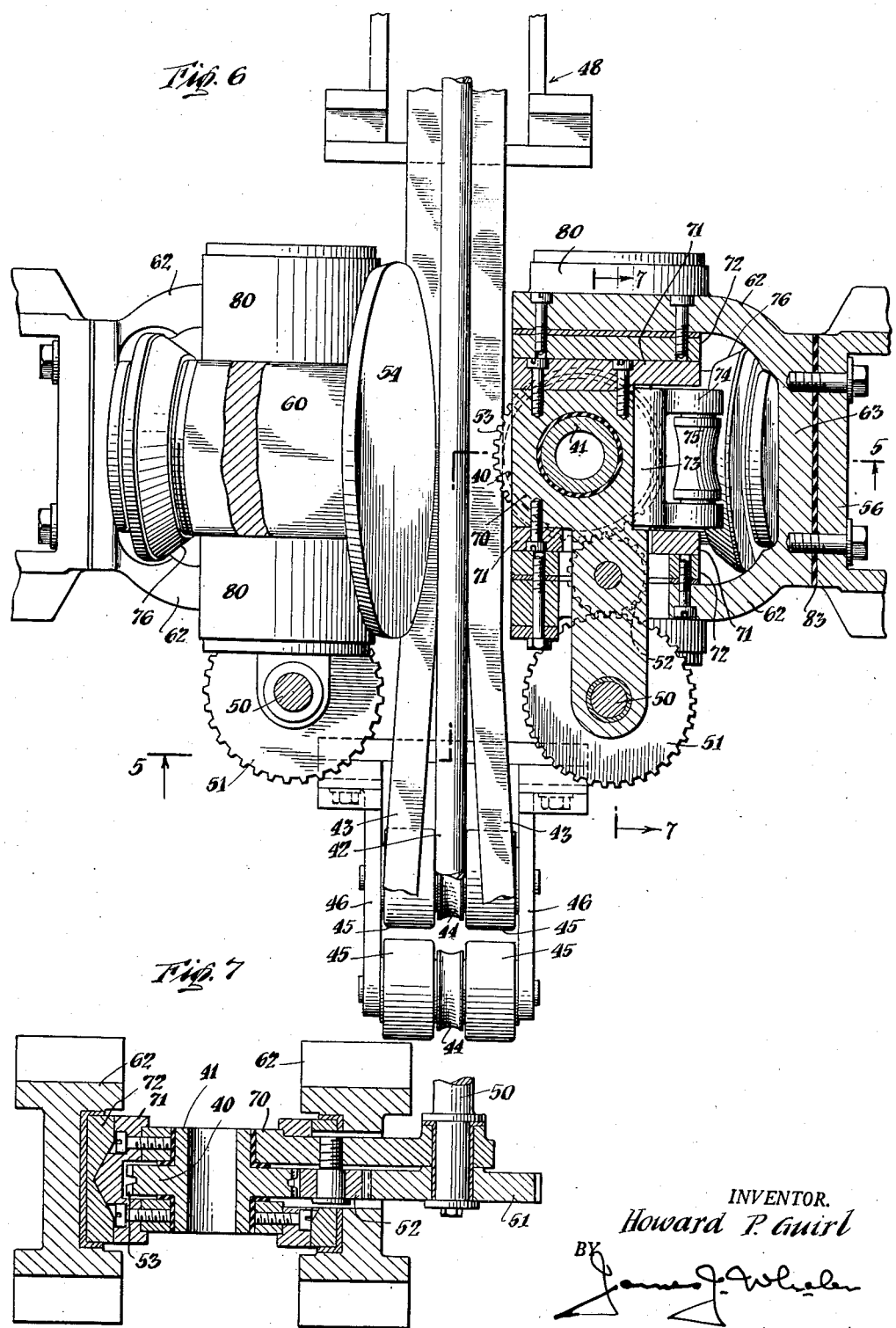
INVENTOR.
Howard P. Guirl
BY 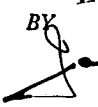
ATTORNEY

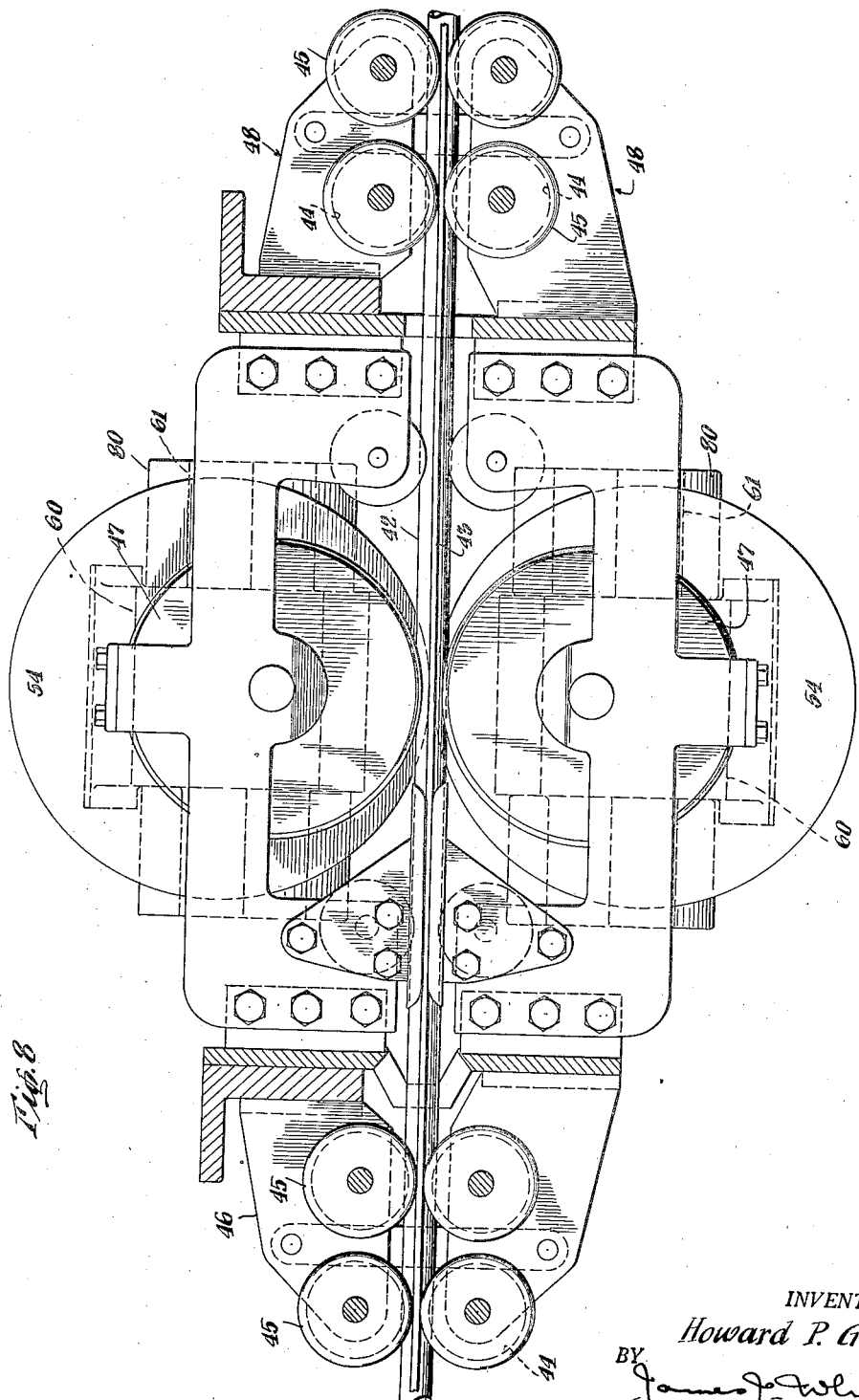

Patented Aug. 7, 1945

2,381,742

UNITED STATES PATENT OFFICE 2,381,742

RESISTANCE WELDING METALLIC STRIPS TO METALLIC BODIES

Howard P. Guirl, Munster, Ind., assignor to The Superheater Company, New York, N. Y.

Application December 27, 1943, Serial No. 515,764

2 Claims. (Cl. 219—4)

This invention relates to electrical resistance welding and particularly to an improved apparatus for providing a metallic tube with radially applied solid metal fins or strengthening a metallic sheet or bar with strips welded to its surface.

The provision of fins on fluid circulating tubes increases the heat transfer from the fluid to a gas surrounding the fins, or the reverse, while the application of strips on a plate or bar serves to increase its structural strength. The invention will be described in detail as it applies to the welding of a fin or fins to a metallic tube carried out by resistance welding operating at high speed and with small labor and power requirements compared to other types of welding.

In the accompanying drawings:

Figure 1 is a diagrammatic view illustrating the welding of metallic fins to heat transfer tubes in accordance with the present invention;

Figure 2 is an enlarged view of part of the apparatus shown in Figure 1 and illustrates the relation of the welding electrodes to the tube and a pair of diametrically positioned fins;

Figure 3 is an enlarged view similar to Figure 2 illustrating the arrangement of the welding electrode when a single narrow fin is applied to a tube at one time;

Figure 5 is a view on an enlarged scale taken on the line 5—5 in Figure 6 and shows an end view of a tube and related fins as they pass between the welding electrodes;

Figure 4:
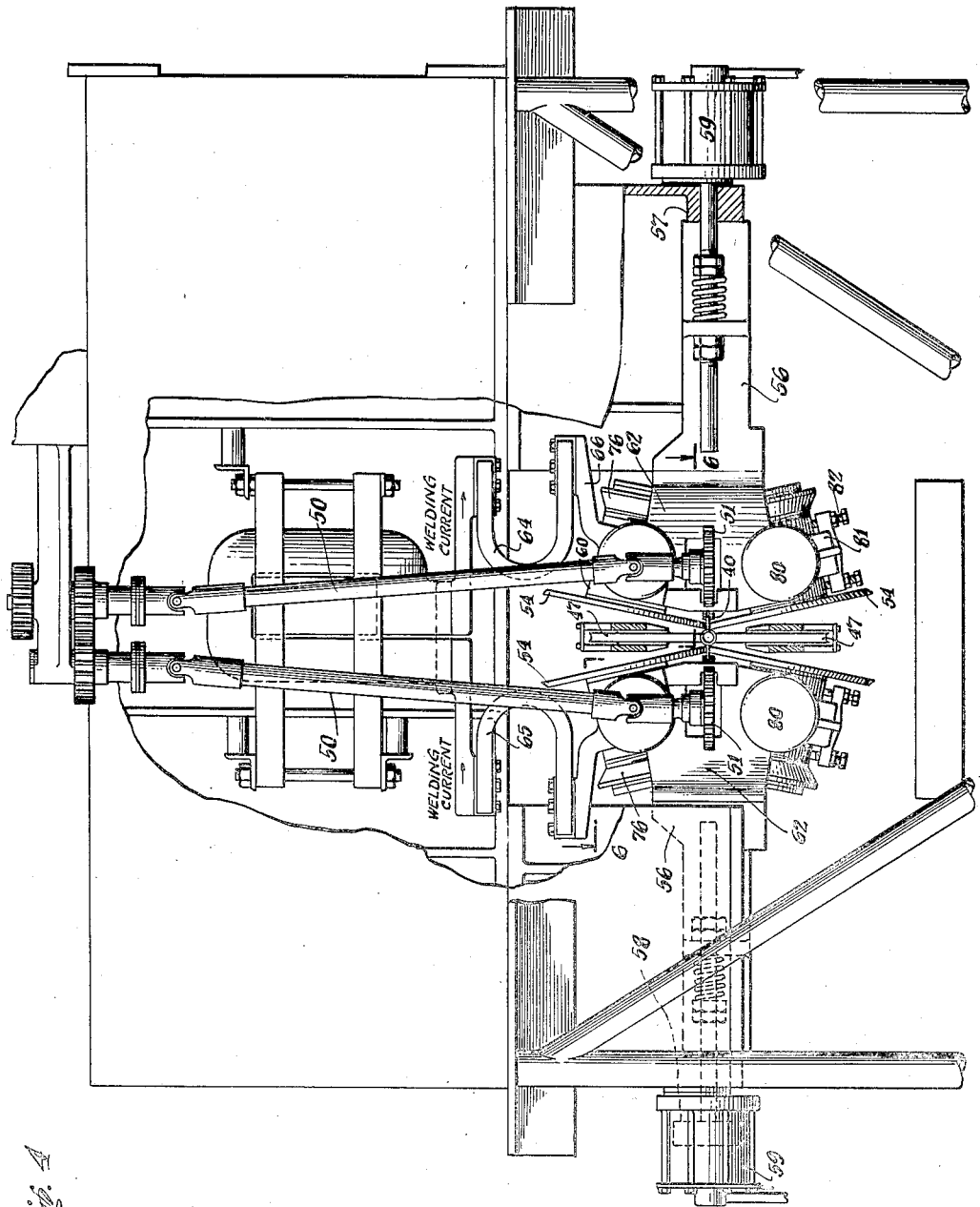
Figure 4 is an end elevational view of a preferred form of welding apparatus for carrying out the fin welding method shown diagrammatically in Figure 1.

Figure 6 is a view on an enlarged scale on the line 6—6 in Figure 4 and shows a tube and related fins passing between the electrodes as viewed in plan; and Figure 7 is an enlarged view on the line 7—7 in Figure 6 and illustrates the driving mechanism for certain of the fin advancing rolls; and Figure 8 is a sectional elevation on the line 8—8 in Figure 5 showing the work feeding devices and electrodes at the welding station.

In welding solid metallic members that are commercially available in the form of hot rolled strip to metallic bars or tubes, I have found that if a strip is narrow with respect to its thickness the fin or strip 10 (Fig. 3) may be welded to the tube or rod 11 by traversing its free longitudinal edge 12 with a copper roll 13 shaped peripherally to fit the edge of the fin while a second copper roll 14 bears against the opposite side of the tube. The roll 13 is connected to one side of a source of electric current and the roll 14 to the other side of the power source. The rolls 13 and 14 are rotated by suitable mechanical means acting through their shafts 16, 17 and pressure is applied as by means of air cylinders (not shown) to press the rolls toward each other while the bar 11 and strip 10 are advanced between them as they rotate. A heavy electric current passed between the rolls causes the edge 18 of the strip 10 and the contiguous part of the bar 11 contacted thereby to heat up so as to produce a high electrical resistance at this point. As the metal becomes hotter it softens, releasing some of the pressure at the point of contact so as to further increase the resistance and temperature. Finally the fin or strip 10 and tube or bar 11 attain a temperature where they fuse together under pressure applied by the rolls 13, 14. This action takes place intermittently or continuously depending upon the nature and manner of applying the electrical current.

With fins that are wide (radially) with respect to their thickness the path of the current passing between the welding electrodes or rolls riding on the edge of the fin and wall of a tube would be so long that the resistance within the fin itself would exceed that at the contact point between fin and tube with the result that the center of the fin would melt before the current reached a high enough value to weld the edge of the fin to the tube. To avoid this difficulty the invention contemplates that welding electrodes in the form of rolls or discs 20 (Figs. 1 and 2) contact the side faces of the fins closely adjacent the point where the longitudinal edges 18 of the fin are pressed against the tube 11 so as to avoid the high resistance within a wide fin. When the welding electrodes 20 contact the sides of the fin as shown in Figures 1 and 2 other rollers 21 contact its longitudinal edge 12 for applying pressure and advancing the fin and tubes through the machine.

In operation of the apparatus shown in Figs. 1 and 2 a tube 11 and two diametrically positioned fins 10 are inserted through the guide rolls which hold the tube and fins in proper relative position. As the fins 10 reach the driving rollers 21, 22 the electrical current is turned on to pass from the upper weld roll 20 into the upper fin 10, through the tube 11 and out through the lower fin 10 to the lower roll 20 and to the other side of the circuit. No current passes through the pressure rolls 21, 31, whose purpose is to hold the work 10, 11 tightly against the welding rolls 20 so that no heating occurs between the welding rolls 20 and fins 10. These rolls assure that the tube and fins are held in the correct position while being welded.

A more complete welding machine embodying these principles is shown in Figures 4 to 7. At the welding station there are grooved pressure and feed rolls 40 mounted in horizontal alinement on vertical shafts 41 mounted in cross-heads 70 which will be referred to later. The rolls 40 are disposed to receive a metallic tube 42 and diametrically positioned fins 43 that are to be welded to the latter, the outer longitudinal edges of the fins being contacted by the grooved portions of the feed rolls which press them against the tubes. In advance of the welding station the tube and fins are supported and guided by rolls 44, 45, respectively (Fig. 6), carried by brackets 46 while at the welding station there are tube guide rolls 47, shown in Figs. 5 and 8 but omitted for clarity in Figs. 4 and 6. Beyond the welding station other fin and tube guide rolls are mounted in a bracket 48.

The feed rolls 40 are driven from a motor, not shown, through the universal-jointed shafts 50 which carry at their lower ends the gears 51 that drive idlers 52 (Fig. 6) meshing with gear teeth 53 on the periphery of the feed rolls 40. Rotary electrodes in the form of bevelled metallic discs 54 are mounted on inclined axes 55 above and below each feed roll 40 so as to be engageable with opposite side faces of a fin 43 at a point between its outer longitudinal edge and the tube 42, preferably quite close to the latter. Each feed and pressure roll 40 and the two associated electrode discs 54, 54 are all movable toward the fins and tubes as a unit, being carried by a slide 56 which is guided for reciprocatory movement on the part 57 of the framework of the machine. The slide is connected with the free end of the piston of a hydraulic motor 59. Inasmuch as the welding apparatus for the fins at both sides of the tube are identical the following description will deal with the devices at only one side.

Each electrode wheel 54 is attached to a shaft 55 mounted in a sleeve 60 which has pintles 61 at either side (Fig. 6) for journalling it between the bifurcated arms 62 of a yoke 63 fixed to the slide 56. The conductors 64, 65 for the welding current are connected to lugs 66 on the sleeves 60 for the two upper welding discs. The associated feed and pressure roll 40 mounted between upper and lower welding discs 54 to bear against the edge of a fin at the side of the tube is movably mounted with respect to the welding discs and slide 56, its shaft 41 being journalled in the crosshead 70 which has wear blocks 71 (Fig. 7) on its sides to guide it for movement toward and away from the tube in tracks 72 carried on the inner faces of the bifurcations 62 of yoke 63. As appears in Fig. 5, the outer face of the crosshead 70 is formed with recesses receiving the cylindrical ends 73 of yoke-like pitmans 74 that carry insulated rollers 75 bearing against bevelled discs 76 attached to the outer ends of the sleeves 60 that support the shaft 55 for the electrode discs 54. Below the trunnion 80 on the yoke arms 62 supporting the sleeve 60 of the lower welding disc 54 is a bracket-like projection 81 carrying adjustable stop screws 82 that are engageable with the sleeve 60 for this lower welding disc to hold it against clockwise movement beyond a predetermined adjusted position.

In operation a tube 42 and a pair of fins 43 are inserted in proper linear relationship into the machine and are guided by the rolls 44, 47 and 45 respectively to a position where the outer longitudinal edges of the fins are engaged by the feeding and pressure rolls 40. At this time the slides 51 are being pressed inwardly by the air cylinders 59 but held against stops which prevent their movement toward each other beyond positions separated by a distance slightly less than the measurement of the tube with a fin at either side thereof. As the tube 42 and fins 43 enter between the pressure rolls 40 the latter and the cross-heads 70 carrying them are pushed back outwardly between the arms 62 of the yokes 63. As the pitmans 74 attached to the outer faces of the cross-heads 68 move out with the latter, the rolls 75 carried by the pitmans become wedged between the bevelled inclines of two adjacent discs 76 thus forcing the rear ends of the bearing sleeves 60 apart and rotating the upper bearings about their trunnions so as to press the upper electrode discs 54 against the upper sides of the fins and forcing the fins against the lower welding electrode discs. At this time the bearings 60 for the lower welding disc 54 do not turn about their trunnions since they are held by their stop screws 82. At this point the welding current is turned on, preferably automatically by appropriate mechanism, not shown.

The current passes from the conductor 64 to the top bearing 60 at the right and thence into the top of the fin through the right top welding wheel 54. The current also flows from the trunnions of this upper bearing through the support yoke bifurcations 62 into the bearing for the lower electrode wheel and thence into the bottom of the fin through the lower welding electrode disc. Thence the current passes from the fin into the tube and through to the fin at the opposite side thereof and into the related electrodes and thence to the conductor 65 that is attached to the upper bearing at the left. No current passes through the pressure and feed rolls 40 or the cross-heads 70 in which they are mounted since these parts are insulated electrically from the electrode disc 60 and associated parts by means of the insulating sleeves on the shaft for the rollers 75 carried by the pitmans associated with the cross-heads and by the insulating members 83 mounted between the yokes 63 and the slides 56. The electrode discs 54 are turned by frictional contact with the fins as they advance and welding continues along the length of the tube until the rear end of the fin is approached. At the proper time the current is turned off as the tube and fins attached thereto pass from the machine over the guide rolls carried by the bracket 48 at the discharge side of the machine.

If, when welding wide fins to tubes, the fin is straight as the weld is started, the weld joint between the fin and tube may be very weak at the starting point at the end of the fin but increases in strength as welding proceeds to a point several inches from the start. As disclosed in my copending application Serial No. 475,520 filed February 11, 1943, this condition is corrected as by imposing a semi-permanent curvature on the fin prior to welding so as to cause the fin or fins to diverge from the tube beyond the contacting ends in a continuous curve as appears in Figure 6. This has the effect of allowing only a small part along the length of a fin to be in contact with the tube when the weld is started, thus assuring that all of the current passed between the rolls flows through this point making a weld of consistent strength at the start. If such curvature is not employed, the current may pass through numerous points or along a relatively long line of contact between the fin and tube so that not enough current flows at any point to produce a weld. Under this condition as the work progresses from the starting point the fin and tube diverge due to the curvature of the fin from the welding process and a point is reached where the pressure between fin and tube is low enough to again cause heating of fin edge and tube, resulting in a weld at that point. This process continues along the length of the work. By increasing the curvature of the fin, the points at which welds take place can be moved closer together. This is because the divergence of fin and tube in greater, thereby decreasing the distance between the preceding weld and the point at which pressure becomes light enough to cause a similar weld. The above discussion assumes constant pressure from the pressure rolls and constant current conditions. It is possible, though, to change the weld spacing by means of changes in roll pressure, assuming that fin curvature and current conditions are held constant. A lighter pressure causes closer weld spacing. With fin curvature and pressure constant, some variation in weld spacing is possible by varying values of current. Besides varying values of current the intermittent application of current permits even wider variation in welding conditions. It is possible to synchronize the speed of travel of the work with the frequency of application of current in such a way that the current is applied at the instant when the pressure conditions between fin and tube are correct for welding. This results in an increase of strength and consistency of welds and in an economy of electric power. When using alternating current, the alternations themselves may be used to produce intermittent applications of welding current, or the current may be switched off and on with several cycles of the power frequency included in both the on and off periods.

What I claim is:

1. Welding apparatus for joining metallic strip members such as fins of rectangular cross-section to a metallic body such as a heat transfer tube; means for guiding the tube and fins to the welding station with the fins extending longitudinally of said tube and contacting the latter along their narrowest faces; a pair of rotary electrode discs located at the welding station at either side of said tube adjacent the path of one of said fins, the electrode discs of either pair being so disposed as to engage opposite side faces of the adjacent fin close to its juncture with said tube; means supporting said electrode discs out of the positions in which they contact said fins; means responsive to the engagement of said feed wheels with the longitudinal faces of said fins for moving said discs into contact with the side faces of said fins; a pair of spaced work feeding and guide wheels mounted in alinement at the welding station each formed to engage the outer longitudinal face of one of the pair of said fins; and electrical means for conducting a welding current into said discs to pass through said fins and said body for welding them together.

2. Welding apparatus for joining metallic strip members such as fins of rectangular cross-section to a metallic body such as a heat transfer tube; means for guiding the tube and fins to the welding station with the fins extending longitudinally of said tube and contacting the latter along their narrowest faces; a pair of rotary electrode discs located at the welding station at either side of said tube adjacent the path of one of said fins, the electrode discs of either pair being so disposed as to engage opposite side faces of the adjacent fin close to its juncture with said tube; means supporting the electrode discs out of the positions in which they contact said fins; a pair of spaced work feeding and guide wheels mounted in alinement at the welding station each formed to engage the outer longitudinal face of one of the pair of said fins; means operable by said feed wheels upon their engagement with said fins for moving said electrode discs into contact with the side faces of said fins; and electrical means for conducting a welding current into said discs to pass through said fins and said body for welding them together.

HOWARD P. GUIRL.